Oct. 22, 1963  F. P. BUNDY  3,107,395
HIGH PRESSURE HIGH TEMPERATURE APPARATUS
Filed Nov. 27, 1959  2 Sheets-Sheet 1
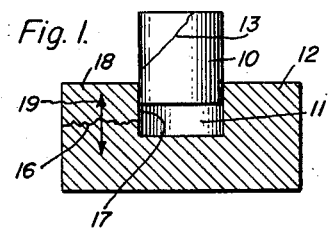
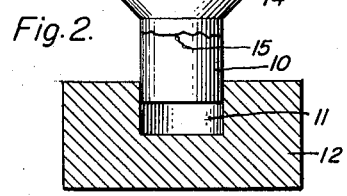
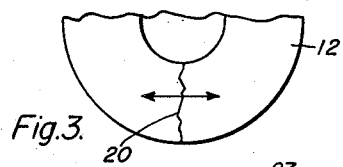
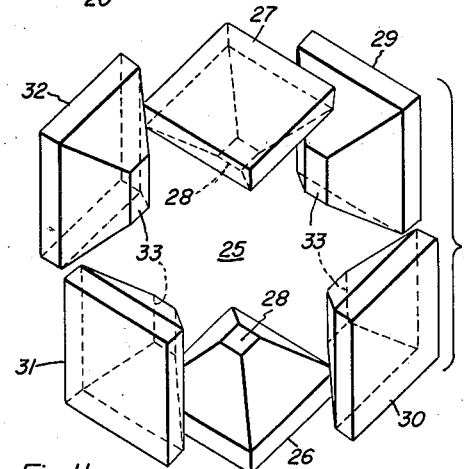
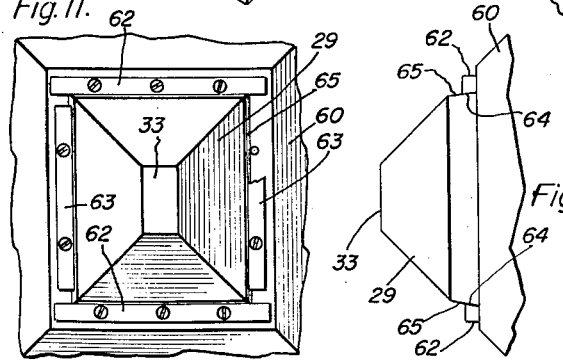
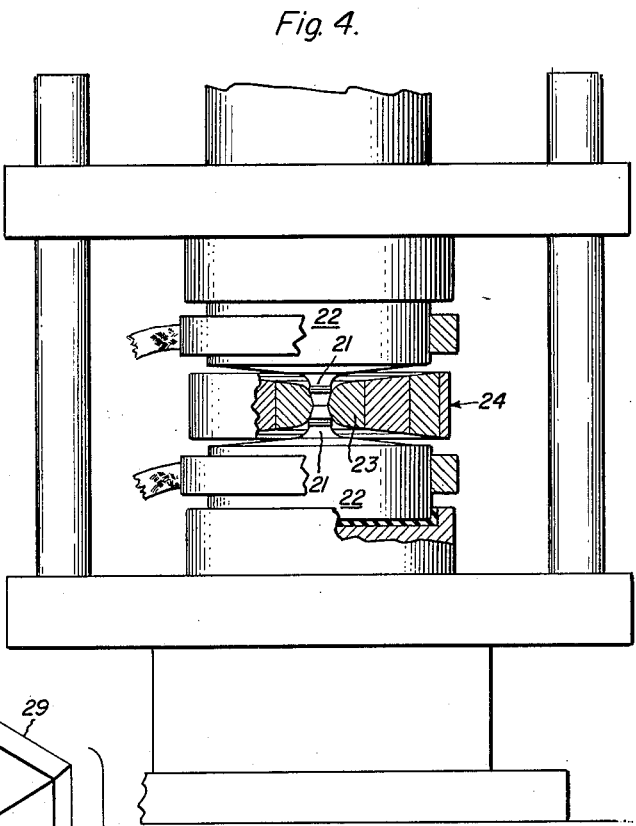
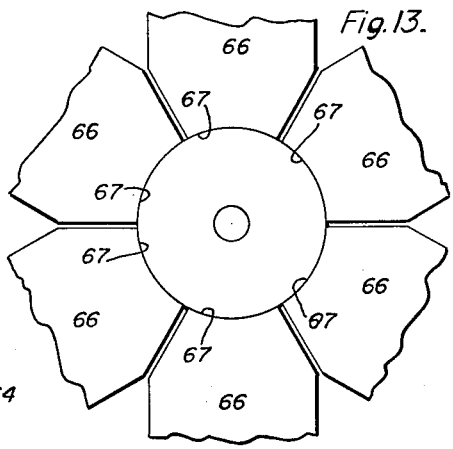
Inventor:
Francis P. Bundy,
by James J. Lichiello
His Attorney.

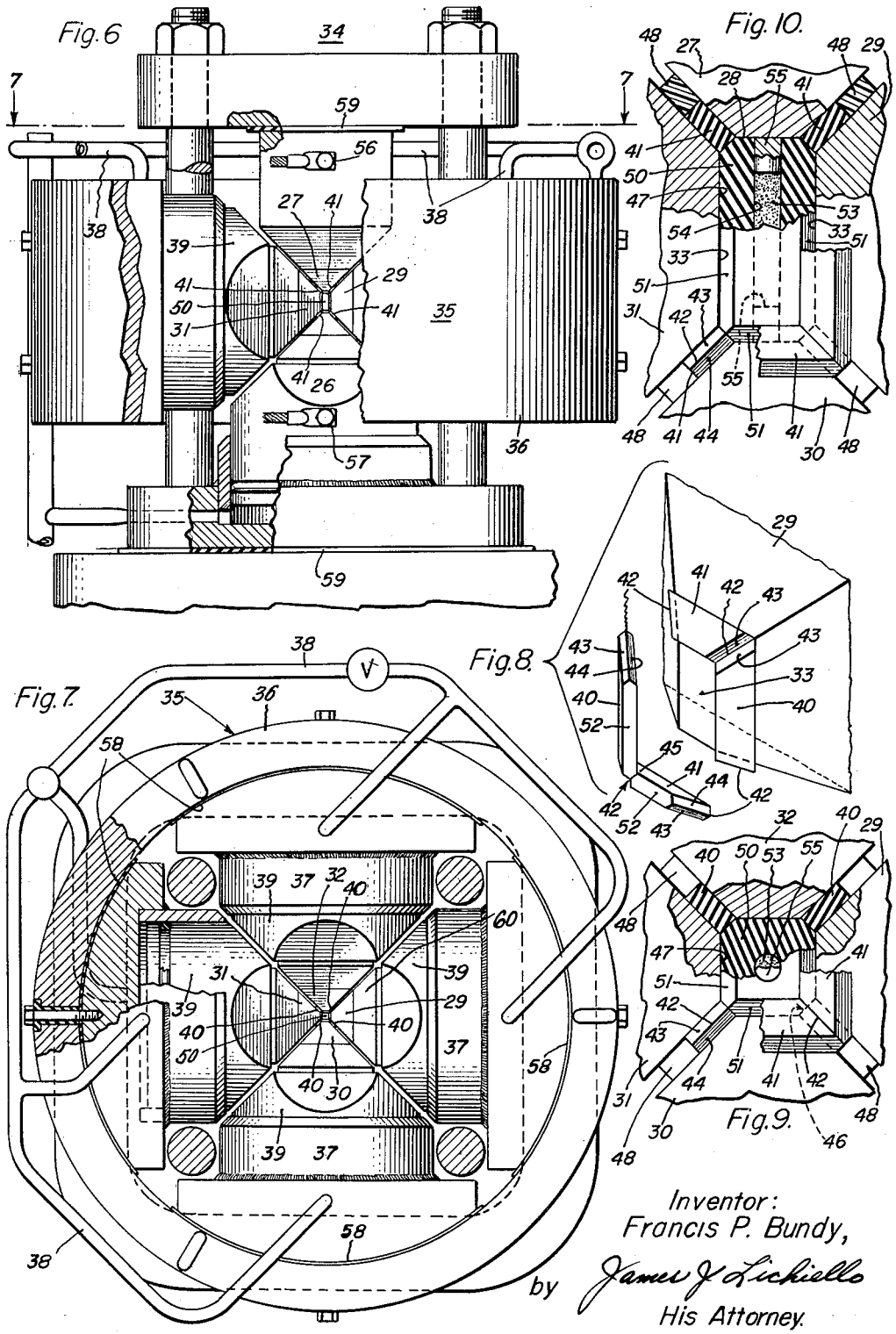

United States Patent Office 3,107,395
Patented Oct. 22, 1963

3,107,395
HIGH PRESSURE HIGH TEMPERATURE APPARATUS
Francis P. Bundy, Scotia, N.Y., assignor to General Electric Company, a corporation of New York
Filed Nov. 27, 1959, Ser. No. 855,867
6 Claims. (Cl. 18—16)

This invention relates to a high pressure high temperature apparatus capable of attaining a combination of very high pressures and temperature upon a given reaction vessel or specimen and sustaining these conditions over extended periods of time.

Apparatus capable of attaining and sustaining high pressures and high temperatures, for example 200,000 atmospheres and greater and 5000° C. and greater, either singly or in combination presents various problems, relating to for example, strength of materials, electrical conductivity of the materials, thermal characteristics of the materials, and the required motion of punches to provide such pressures. A more important problem relates to proper support of highly stressed parts. Lack of proper support has, in the past, limited the extent of pressure capacity in various systems.

A simple punch and die assembly, such as the piston and cylinder variety, generally fails at pressures on the order of 50,000 atmospheres. Increases in pressures and temperatures are severely limited because, in one instance, of the lack of materials which will withstand such pressures and temperatures including the hardest of the tool steels and the cemented tungsten carbides. In the piston and cylinder pressure apparatus, the cylinder generally fails because of one or more forces or stresses imposed, for example, hoop tension of the cylinder, plastic deformation of the interior diameter of the cylinder, or from what is generally referred to as the Poisson effect.

It is therefore an object of this invention to provide an improved high pressure high temperature apparatus.

It is another object of this invention to provide more nearly isotropic compression in a specimen in a high pressure apparatus.

It is still another object of this invention to utilize moving punches to provide lateral support of adjacent punches.

It is another object of this invention to minimize sliding friction between highly stressed pressure confining members.

It is still a further object of this invention to permit generation of high pressures with limited punch motion.

It is a further object of this invention to provide a high pressure apparatus capable of generating higher pressures with lower strength materials.

It is yet another object of this invention to provide a high pressure apparatus with a theoretically unlimited pressure capability.

Briefly described this invention in one form, includes a multiple punch apparatus where the configuration of the punches defines a reaction chamber towards which all of the punches may move to generate the given pressure, and where each punch provides lateral support for adjacent punches.

This invention will be better understood when taken in connection with the following specification and the drawings in which;

FIG. 1 is a schematic representation of a simple piston and cylinder pressure apparatus;

FIG. 2 is a modification of FIG. 1 illustrating a flared and supported punch;

FIG. 3 is an illustration of a specific failure in a die;

FIG. 4 is an illustration of a belt apparatus from copending application S.N. 707,432—Hall, now U.S. Patent 2,941,248;

FIG. 5 is a schematic representation of multiple pistons defining, upon movement towards each other, a reaction chamber;

FIG. 6 is an illustration of a press apparatus employing the multiple pistons of FIG. 5;

FIG. 7 is a top plan view of the lateral punch assembly of FIGS. 5 and 6 taken on line 7—7 of FIG. 6;

FIG. 8 is a partial representation of an exemplary punch illustrating gaskets and their positions;

FIG. 9 is an enlarged view of the central portion of FIG. 7 illustrating the gaskets, punches and reaction vessel combination;

FIG. 10 is a side view of the punches, gasket, and reaction chamber combination of FIG. 9;

FIG. 11 is a view of one method of attaching a punch to a piston;

FIG. 12 is a side view of FIG. 11, and

FIG. 13 is a schematic illustration of a modification of this invention.

A piston cylinder combination is diagrammatically illustrated in FIG. 1 by punch or piston 10 adapted for reciprocatory motion within a chamber 11 of cylinder 12. Since the punch 10 is placed in simple axial compression, the maximum pressure which can be generated is limited by the compressive strength of the punch material. Such punches generally fail when the subjective compressive force is on the order of about 50,000 atmospheres, the general line of failure corresponding to that of line 13. While punch 10 may be considerably strengthened through one method of support, by flaring 14 (FIG. 2), compressive failures repetitively occur in the portion 15 just before the flare since this unflared portion is necessary to provide for a proper stroke of the punch into cylinder 11, and leaves a critical area in the punch. Upon a high pressure build-up within the chamber 11 below the piston 10, the material of the die or cylinder 12 generally fails along line 16 (FIG. 1), this type of failure occurring regardless of the diameter of the die or cylinder 12. Failure in this respect is attributed to the Poisson effect where the pressure exerted against the wall 17 of chamber 11 causes bulging along the surface 18. The tensile stresses developed, indicated by arrows 19, cause tensile failure along line 16. High pressure build-up in chamber 11 of FIG. 1 also causes a die to fail from radial stresses or hoop tension. This is illustrated in FIG. 3 by line 20 indicating the fracture of a die under high tensile forces or hoop stresses. Proper support of the highly stressed piston and cylinder may increase the capacity of these systems.

One form of a punch and die assembly or high pressure apparatus which includes adequate support of highly stressed parts and which will sustain very high pressures and high temperatures is illustrated in FIG. 4. The apparatus illustrated in FIG. 4 is generally referred to as the "belt" and is adequately described and claimed in copending application S. N. 707,432, H. Tracy Hall, filed January 6, 1958 and assigned to the same assignee as the present invention, now U.S. Patent 2,941,248. The teachings of that application with respect to design of high pressure and high temperature apparatus is incorporated by reference herewith. The important features of the belt, in one form is the use of a tapered punch 21, for example frusto-conical, moving into a tapered die 23, for example frusto-conical, with a stone-like gasket between and engaging the tapered portions of the punch and die, and permitting motion of the punch through compressibility of the gasket material. Support of highly stressed parts is obtained by the taper of the punch, the taper of the die, the binding rings, and the use of a predetermined pressure gradient in the gasket material to provide lateral support of the punches. The punch and binding ring assembly is illustrated as 22 and the die and binding ring assembly as 24.

Further progress in the field of high pressure and high temperature apparatus has indicated the desirability of increasing the pressure range and also size of the reaction vessel. However, a mere increase in size of the piston and cylinder arrangement of FIG. 1 or a mere increase in the size of the belt of FIG. 4 will not increase attainable pressures and pose difficult problems because the manufacture of large pieces of cemented tungsten carbide is impractical. Also, failures may occur in the center of the die assembly notwithstanding the diameter. Furthermore, in connection with larger specimen material sizes, compression of the specimen materials is less isotropic and the internal friction created by motion of the punch or die is extremely high. Because of unequal loading and difficulty of supporting both the piston and the die, pressures greatly in excess of, for example, 160,000 atmospheres are extremely difficult to attain in the apparatus illustrated in FIG. 4. However, the present invention relates to a solution of these and other related problems and difficulties which enable higher pressures and temperatures to be attained.

These and other problems as discussed above may be overcome by employing a plurality of punches to define a reaction chamber.

Referring now to FIG. 5, there is shown one embodiment of this invention, i.e., multiple punches defining a reaction chamber. Punch assembly 25 is shown in a partial and schematic view in order to facilitate its description. In FIG. 5, a pair of oppositely moving vertical punches 26 and 27 define the top and bottom surface of a reaction chamber by their faces 28. Spaced circumferentially about oppositely moving vertical punches 26 and 27 are a plurality of laterally or horizontally moveable punches, for example four, 29, 30, 31 and 32. The lateral punches are spaced 90° from each other and are positioned in a plane perpendicular to and concentric with the vertical line of punches 26 and 27. The words vertical and horizontal or lateral are employed as simple expedients to indicate a 90° angle between the two sets of punches even through the whole assembly may be rotated angularly to the true vertical. The lateral punches then define by means of their faces 33, the side walls of a reaction chamber. The top and bottom surfaces and the side walls of a reaction chamber are defined by all punches when the punches are caused to move toward a common point. The end portions of all punches are trapezoidal and all interfit, i.e., all tapered surfaces lie parallel to and flush with adjacent surfaces of adjacent punches, to define a closed chamber or volume. It is apparent that the reaction chamber may be a cube, rectangular parallelepiped, or any other configurations as the faces of the punches may define. The punches are thus defined as longitudinally or axially tapering from a larger section to a smaller section to define a transverse face end portion. The punches are moved axially along their longitudinal axes so that each of said transverse faces define a wall of the reaction chamber. The transverse faces need not be planar, i.e., they may be arcuate as in FIG. 13.

In practice, vertical punches 26 and 27 becomes the oppositely moving punches in a press apparatus. An exemplary apparatus as disclosed in FIG. 6 includes a press 34 of well known and established design. Punch 26 is hydraulically moveable toward punch 27. The lateral punch assembly 25 of FIG. 5, including punches 29, 30, 31 and 32, is positioned within a ring member 35, and positioned concentric with vertical punches 26 and 27 in a horizontal plane.

Ring member 35 as illustrated in FIG. 7, includes a massive forged steel ring 36 which in one example is of approximately 40 inches in diameter and 15 inches high. Positioned equatorially within the internal periphery of the ring 36 are a plurality of hydraulic cylinders 37 interconnected by means of suitable hydraulic conduits 38 in order that fluid pressure within all cylinders will be equal. Individual and well known control elements may also be utilized to control pressure and punch movement for one or more punches. Within each cylinder 37 there is positioned a piston 39. Punches 29, 30, 31 and 32 are, in this instance, separable members which are suitably attached to pistons 39. Where four lateral pistons are employed each punch tapers at a 45° angle to present a trapezoid configuration. Suitable variations in the aforementioned angle may take place where additional or less pistons are employed, or where provision is made for tapered gaskets therebetween as hereinafter described, or where the configuration of the vertical punches may be altered, for example, if the punch side surfaces of vertical punches 26 and 27 were frusto-conical. Ring member 35 is thereafter positioned within the press as illustrated in FIG. 6, such that, upon motion of all the punches by application of hydraulic pressure, the punches move toward a common center, and because of the punch face configuration, i.e., trapezoidal, a reaction chamber is defined.

It is of course obvious that mere motion of all punches towards a common center will not develop a pressure upon an object which is of a similar dimension or smaller than the closed reaction chamber defined, and that compression of an object much larger than the reaction chamber may result, in such a high pressure high temperature apparatus, in leakage of the specimen between the punches. Utilizing, therefore, the teachings in the aforementioned copending application S.N. 707,432, H. Tracy Hall, now U.S. Patent 2,941,248, punch motion is transmitted through compressibility of a particular type of gasket. A gasket serves many important functions, including sealing in the contents of the chamber, allowing a rather large movement of the punch relative to the reaction chamber, providing electrical insulation between adjacent punches when electrical resistance heating is employed, and providing proper support to the punches. To be successful the gasket must hold firmly through all phases of the cycle, i.e., during loading, holding, high temperature application, and unloading. Among materials having these general properties are certain ceramics (oxides) or stones, for example, wonderstone and pipestone, pyrophyllite and catlinite respectively. Any gasket must have the property of gripping the surfaces of the punches and yet be capable of undergoing large plastic shear distortions without losing shear strength. The shear strength of the material should be great enough to prevent gasket blowout during all parts of the operation and yet not resist movement of the punches excessively.

Suitable pyrophyllite gaskets are positioned on each punch to engage tapering surfaces of adjacent punches. These gaskets provide lateral support for the punches to enable them to withstand extreme imposed forces. Theorectically, perfect lateral support will enable such a described punch to withstand indefinite pressure. In the belt apparatus in FIG. 4, one principle which permits the attainment of high pressure is lateral support which is defined by a tapered punch and a tapered die and a gasket between and engaging the tapered surfaces to permit motion. In the instant invention, as in the belt, these gaskets are stressed from a maximum next adjacent the reaction chamber to a minimum at the outer extremity. Each punch is supported, through a gasket, by adjacent punches so that all punches are in turn supported and the assembly is then capable of attaining and maintaining pressures much greater than 100,000 atmospheres. A further advantage of such a described press is that materials of less hardness than cemented tungsten carbides may be employed. For example, pressures in excess of 75,000 atmospheres have been attained in this press utilizing steel punches, where, for example, the same steel in a piston and cylinder combination would fail in the 30 to 50,000 atmosphere range. Punches and related parts may also be made smaller, failures are localized and tensile stresses are maintained not only at a minimum but also only in the outer parts.

The gaskets employed in this press apparatus are shaped to fit the particular punch face configuration employed. In the exemplary illustration where six punches are employed, and where the punches are trapezoidal, the gaskets take the form illustrated in FIG. 8.

Referring to FIG. 8, gasket 40 is a typical gasket employed between the lateral punches 29, 30, 31 and 32, and gasket 41 is a typical gasket employed between vertical punches 26 and 27 and their mating lateral punches. These gaskets may be suitably attached to their respective punches. The edges 42 of each gasket are tapered at an angle corresponding to the angle of the punch. In addition, each edge 42 includes opposite bevels 43 and 44 of 120°. The bevels permit smooth corners of the gaskets as indicated by numeral 45 and all gaskets cooperate to provide an unbroken volume of gasket material and reaction vessel. With the gasket assembly positioned on a punch as illustrated in FIG. 8 with the two extended gaskets 40 and 41 in position, and with each punch in position, the relationship of gaskets, punches and reaction vessel is more clearly presented in FIG. 9.

FIG. 9 is an enlarged view of the central portion of FIG. 7 and in partial section. An inspection of the bevels 43 and 44 together with the joint 46 illustrates not only the continuous volume of all interrelated gaskets, but also a defined volume 47 for the reaction chamber or vessel. The configuration of all gaskets are similar, the only difference being that for a top and bottom gasket to form a defined square, the gaskets 41 are of less length than a side gasket 40 (FIG. 8). It is seen that the gaskets space all punches from each other permitting motion of all punches, through compression of the gaskets, towards each other. Maximum punch motion to develop a given pressure is much less in this invention than in the belt apparatus simply because reduction in volume may take place simultaneously from all sides, while in the belt such reduction takes place from one or two ends only. This becomes advantageous in the development of very high pressures where gaskets pose problems relative to punch motion and sealing ability.

It has been previously mentioned that the gaskets provide lateral support for the punches and also permit movement of the punches through compression. The compression provides lateral support which varies from a maximum next adjacent the reaction vessel to a minimum at the outer extremity, somewhat asymptotically. Lateral support may be changed by the use of tapered or contoured gaskets and/or changes in the taper or contour of the punches. In this manner certain sections of the gasket may be compressed before or after other sections. Additionally, such changes may be employed as a graded seal for sealing purposes during loading and particular concentrations of lateral support. To prevent, if desirable, minimal lateral support at the outer extremes of the gasket, and to facilitate assembly, a rubber or suitable plastic elastic or resilient member 48 (FIG. 9) may be employed. Member 48 may be cemented to a gasket and then cemented to a punch for ease in assembly of the gasket structure. At the same time it prevents crumbling of the extremity of the gasket, maintains the general position of the gasket, extends and controls lateral support.

A suitable reaction vessel to be employed with this apparatus is disclosed in FIG. 10. In FIG. 10, reaction vessel 50 comprises a rectangular block, or substantially a rectangular parallelepiped, of the same material as the gaskets, and whose edges 51 are thin rectangular planes which lie adjacent the rectangular planes 52 of the gaskets 40 and 41. A specimen material 53 to be subjected to high pressures and high temperatures is positioned generally centrally within the reaction vessel 50. Such positioning may be accomplished by several methods for example, by having an opening 54 into the vessel 50 wherein the specimen 53 is placed, and thereafter if necessary, closing the vessel with close fitting plugs 55. Heating of the reaction vessel is accomplished in one method by the resistance heating method where current passes from one punch through the reaction vessel into another punch. Specimen 53 in reaction vessel 50 may be electrically conductive, made electrically conductive, or suitable heaters may be employed within the vessel.

In FIG. 6, an electrical connection 56 is connected to a source of power, not shown, and conducts current from the said source through vertical punch 27 to plug 55 (FIG. 10) and into the specimen, heater, etc. in the reaction vessel 50. In this instance, for example, the specimen is electrically conductive and electrically conducting plugs 55 are employed. From the reaction vessel current flows through lower plug 55 (not shown), punch 26 and through an additional electrical connector 57 (FIG. 6). It is obvious that choosing a current path between the vertical punches eliminates the remainder of the punches from the electrical circuits as all punches are insulated from each other by the aforementioned gaskets. Furthermore, each punch is insulated from ring 36 (FIG. 7) by a layer of insulation 58 between each punch assembly and ring 36 so that a pair of opposite lateral punches may be so employed. The vertical punches are also insulated from the press apparatus as indicated by numeral 59.

Attainment of high pressures does not require that all punches actually move. In the belt apparatus, the result of both punches moving is attained where only one punch moves, and the other punch moves relative to the die. To apply this principle to the present invention, moving of one vertical punch (FIG. 5), for example, punch 26 with punch 27 moving relative to the horizontal punches provides double ending or the same effect as if both punches moved. By the same token, only two adjacent horizontal punches need move. An exemplary control is illustrated as valve 61 (FIG. 7) which restricts flow of hydraulic fluid to move punches 29 and 32. Movement is intended to mean that a punch moves along its axis toward the reaction chamber, and sliding means a punch sliding along a line perpendicular to its axis. For example, in FIG. 7, if punches 30 and 31 were the only punches to move (also considering vertical punch 26 moving) and if all lateral punches were to slide relative to each other, the same effect of all punches moving is obtained. Therefore, provision must be made for the lateral punches to slide relative to each other. This provision is more clearly illustrated in FIG. 11.

Referring now to FIG. 11, there is shown a partial view of punch 29 which is also exemplary of all punches with respect to mounting or assembly. Punch 29 includes its piston 38 (FIG. 7) having a frusto-conical block 60 suitably attached to or integral with one end. Thereafter, punch 29 is attached to block 60. It is obvious that many attaching means well known in the art may be employed. One such attaching means illustrated in FIG. 11 comprises a plurality of flanges 62 and 63 which are bolted to block 60 to form a square or rectangle to receive the back surface of punch 29. The internal surfaces 64 (FIG. 12) of the flanges 62 and 63 are tapered similarly to a taper 65 of the side surfaces of the punch. Once assembled punch 29 is maintained in position because of the engagement of adjacent taper portions on the flanges and punch. If, in FIG. 11 the side flanges 63 are removed, separation of punch 29 from block 60 will not occur, but this punch may slide laterally within the remaining flanges 62. In FIG. 12, it is understood that by means of these flanges, punch 29 may slide horizontally with respect to block 60. Therefore, only two lateral punches need move hydraulically to obtain high pressures, while all lateral punches slide with respect to the flanges as described. Application of this principle for total operation is as follows. With the assembly of FIG. 7 in the press of FIG. 6, movement of punch 26 vertically causes compression of gaskets between punch 26 and all lateral punches. At the same time, the lateral punch assembly 35 as a whole is lifted and forced adjacent top punch 27 so that compression of gaskets occurs between top punch 27 and all lateral punches.

Referring now to FIG. 7, in the lateral punch assembly, movement of punches 30 and 31 causes compression of gaskets between these punches and between punches 29 and 30 and betwen punches 31 and 32. Sliding of punches 30 and 31 maintains proper division of compression in the gaskets between these punches and between these and adjacent punches. Movement of punches 30 and 31 also causes sliding of punches 29 and 32 sliding in their ways (as described for FIG. 11) until compression of gaskets occurs between punches 29 and 30. It is thus understood that all gaskets are compressed for effective sealing and consequent high pressure generation in the reaction vessel. Not all punches need be slidable where the ring assembly is free to move vertically and horizontally and, for example, the moving punches accordingly need not slide.

In some instances separate gaskets need not be employed between the punches. The reaction vessel may be of a particular thickness or of various materials including soft metals. This, in conjunction with predetermined punch spacings provides, upon motion of the punches, extrusion of the reaction vessel material between the punches to serve as a gasket. FIG. 13 is illustrative of this feature showing a plurality of adjacent punches 66 having arcuate faces 67 pushing against a reaction vessel. The faces 67 may be of various configurations including planar, of geometric representation. This also applies to the vertical punches.

Calibration of this apparatus for both pressures and temperatures is obtained by a method similar to that disclosed in the aforementioned Hall application and also well known in the art. The method entails the known feature that certain metals, when subjected to predetermined pressures, undergo marked changes in electrical resistance. These resistance changes occur at, for example, 24,800 atmospheres for bismuth, 43,500 atmospheres for thallium, 53,500 atmospheres for cesium and 77,500 atmospheres for barium. All aforementioned phase changes have been attained in this apparatus and a suitable pressure versus load curve established.

Temperatures in this apparatus were measured by means of thermocouple junctions within the reaction vessel with the lead wires passing through carefully drilled holes in the reaction vessel and gaskets. Examples of thermocouples employed are iron constantin, chromel alumel and platinum-platinum rhodium.

It is thus understood that by means of this invention pressures greatly in excess of 150,000 atmospheres may be attained and maintained simultaneously with high temperatures over extended periods of time. Lateral support is dependent upon the use of a compressible gasket as means to provide movement of a punch with simultaneous sealing and as pressure or force transmission between punches. Further dependency is based upon the use of the gasket between a plurality of tapered punches in order that each may support the other, all punches are supported, and, theoretically, indefinitely high pressures may be attained.

While this invention has been described relative to a pair of vertical punches which move in opposition towards each other, and a plurality of lateral punches moving towards a common point, the invention readily suggests obvious modifications. The number of horizontal punches may vary from a rather unsatisfactory two to an indefinite number, for example, 6 or more. By the same token where the invention describes punches moving in two planes perpendicular to each other, it is obvious that substantailly more planes may be employed which are combinations of vertical and horizontal. The extreme would be, in one instance, a solid metal sphere made up of a plurality of wedges moving towards the center of the sphere and to define, at the center, a reaction chamber. An envelope type of covering about the sphere may supply the pressure or force to move the wedges.

While a specific method and apparatus in accordance with this invention has been shown and described, it is not desired that the invention be limited to the particular description nor to the particular configurations illustrated, and it is intended by the appended claims to cover all modifications within the spirit and scope of the invention.

What I claim as new and desire to secure by Letters Patent of the United States is:

1. An apparatus for the development of high pressures comprising in combination:
   (a) a pair of oppositely positioned tapered punches having tapered side surfaces,
   (b) means supporting said punches for relative movement along coincident axes towards each other,
   (c) an annular support member coaxially positioned intermediate thereof,
   (d) a plurality of punches positioned within said annular member in equal circumferential spacing therein,
   (e) each of said punches having longitudinally inwardly tapered surfaces defining a transverse face end portion,
   (f) each of said face portions defining a wall of a reaction chamber,
   (g) the tapered surfaces of said plurality of punches being arranged in adjacent complementary relationship with each other and with the tapered surfaces of said pair of oppositely positioned punches,
   (h) said plurality of punches positioned for radial inward movement along their longitudinal axes in the diametrical plane of said annular support member and towards the center of said annular member,
   (i) and a preformed gasket between and engaging said tapered surfaces of said punches to provide sealing of the reaction chamber simultaneously with punch motion and to provide motion of said punches through compressibility of the gasket,
   (j) said punches being so positioned and arranged that each provides, together with a gasket, predetermined lateral support for an adjacent punch, and
   (k) fluid actuating means between said plurality of punches and said annular member to move at least some of said plurality of punches to develop high pressure in said reaction chamber.

2. The invention as claimed in claim 1 wherein all said plurality of punches are moved by said fluid actuating means between said punches and said annular member.

3. The invention as claimed in claim 1 wherein each of said punches are of trapezoidal configuration.

4. The invention as recited in claim 1 wherein said plurality of punches in said annular member consists of four equally spaced punches, the transverse face portion of said pair of and said plurality of punches defining a right angle reaction chamber of six sides of regular geometric design.

5. An apparatus for the development of high pressures comprising in combination:
   (a) a pair of oppositely positioned tapered punches having tapered side surfaces,
   (b) means supporting said punches for relative movement along coincident axes towards each other,
   (c) an annular support member coaxially positioned intermediate thereof,
   (d) a purality of lateral punches positioned within said annular member in equal circumferential spacing therein,
   (e) at least a plurality of said lateral punches positioned with their longitudinal axes in the diametrical plane of said annular support member and directed towards the center of said annular member, (f) each of said lateral punches having longitudinally inwardly tapered surfaces defining a transverse face end portion, (g) each of said face portions defining a wall of a reaction chamber, (h) the said tapered surfaces of said lateral punches being arranged in adjacent complementary relationship with each other and with the tapered surfaces of said pair of oppositely positioned punches, (i) guide means cooperative with some of the said lateral punches and said annular member to provide transverse sliding motion of at least a pair of said punches laterally towards an adjacent punch, (j) and a preformed gasket between and engaging said tapered surfaces of said punches, (k) fluid actuating means between at least one of said lateral punches and said ring to move said one lateral punch to develop high pressure in said reaction chamber, (l) said movement of said one lateral punch causing transverse sliding motion of said punches having guide means.

6. An apparatus for the development of high pressures comprising in combination:

(a) a pair of oppositely positioned tapered punches having tapered side surfaces, (b) means supporting said pair of punches for relative movement along coincident axis towards each other, (c) an annular support member coaxially positioned intermediate said oppositely positioned punches, (d) a plurality of punches positioned within said annular support member in equal circumferential spacing therein, (e) said plurality of punches positioned with their longitudinal axes directed towards the center of said annular member, (f) each of said punches having longitudinally inwardly tapered surfaces defining a transverse face end portion, (g) each of said face portions defining a wall of a reaction chamber, (h) the said tapered surfaces of said plurality of punches being arranged in adjacent complementary relationship with each other and with the tapered surfaces of said pair of oppositely positioned punches.

(i) a preformed gasket between and engaging the said tapered surfaces of said punches, (j) said punches cooperating with said gaskets to provide predetermined lateral support for adjacent punches, and (k) fluid actuating means between the said plurality of punches and said annular member to move said plurality of punches in combination with relative motion of said oppositely positioned punches to develop high pressure in said reaction chamber.

References Cited in the file of this patent

UNITED STATES PATENTS

| | | |
|---|---|---|
| 369,784 | Furman | Sept. 13, 1887 |
| 494,004 | Kester | Mar. 21, 1893 |
| 574,404 | DuBrul | Jan. 5, 1897 |
| 698,115 | Hird | Apr. 22, 1902 |
| 2,499,530 | Scott | Mar. 7, 1950 |
| 2,894,281 | Povse et al. | July 14, 1959 |
| 2,918,699 | Hall | Dec. 29, 1959 |
| 2,941,241 | Strong | June 21, 1960 |
| 2,941,248 | Hall | June 21, 1960 |
| 2,941,252 | Bovenkerk | June 21, 1960 |
| 2,947,034 | Wentorf | Aug. 2, 1960 |

OTHER REFERENCES

"The Resistance of 72 Elements, Alloys and Compounds to 100,000 kg./Cm.$^2$", by Bidgeman, American Acad. of Arts and Sciences, vol. 81, #2, 1952, pages 169–184.

Ultra High Pressure Research, Hall, Science, Aug. 29, 1958, vol. 128, #332, pages 445–449.